United States Patent [19]
Replogle

[11] Patent Number: 5,634,764
[45] Date of Patent: Jun. 3, 1997

[54] WORKPIECE PLACEMENT SYSTEM AND METHOD HAVING A VACUUM HOLDING THE WORKPIECE

[76] Inventor: Charles R. Replogle, 8432 N. County Rd., 400 W., Middletown, Ind. 47356

[21] Appl. No.: 289,859

[22] Filed: Aug. 12, 1994

[51] Int. Cl.⁶ ............................................. B65G 25/00
[52] U.S. Cl. ................ 414/752; 198/468.4; 198/487.1; 221/224; 221/239
[58] Field of Search .................................. 414/749, 752, 414/224; 901/40, 22; 294/2, 64.1, 61; 198/468.4, 487.1; 221/224, 239

[56] References Cited

U.S. PATENT DOCUMENTS

| | | |
|---|---|---|
| 2,691,963 | 10/1954 | Seng . |
| 3,260,376 | 7/1966 | Stoll . |
| 3,758,144 | 9/1973 | Dalglish ............................ 294/64.1 |
| 3,865,424 | 2/1975 | Jabkowski . |
| 4,005,782 | 2/1977 | Crockett ............................ 901/16 X |
| 4,107,055 | 8/1978 | Daughetee et al. . |
| 4,603,897 | 8/1986 | Foulke et al. . |
| 4,665,558 | 5/1987 | Burke ................................ 901/22 X |
| 4,687,242 | 8/1987 | Van Rooy ........................ 294/64.1 |
| 4,773,300 | 9/1988 | Klatt et al. . |
| 4,911,490 | 3/1990 | Akagawa . |
| 4,998,859 | 3/1991 | Oshima et al. .................. 414/751 X |
| 5,009,068 | 4/1991 | Clarke . |
| 5,080,552 | 1/1992 | Takahashi et al. ............ 414/224 X |
| 5,191,825 | 3/1993 | Beneteau et al. . |

*Primary Examiner*—Donald W. Underwood
*Attorney, Agent, or Firm*—Woodard, Emhardt, Naughton, Moriarty & McNett

[57] ABSTRACT

The present invention relates to a workpiece placement system for picking and placing a workpiece on a product being assembled. The workpiece placement system includes a mechanical housing having a telescopic arm that is extendable between a retracted position and an extended position. A vacuum source providing a vacuum pressure below ambient conditions is in fluid communication with a vacuum conduit along the telescopic arm. The telescopic arm includes at least one opening at its distal end that allows the vacuum pressure to suck and hold the workpiece in place on the telescopic arm. The workpiece is securely held in place on the telescopic arm as it is extended from the initial retracted position to the extended position. After the telescopic arm is fully extended the workpiece is positioned proximate the product being assembled, and the vacuum is interrupted to release the workpiece.

9 Claims, 5 Drawing Sheets

1

WORKPIECE PLACEMENT SYSTEM AND METHOD HAVING A VACUUM HOLDING THE WORKPIECE

BACKGROUND OF THE INVENTION

The present invention relates in general to the design and construction of a workpiece placement system for picking and placing a workpiece on a product being manufactured. More particularly, the present invention relates to a workpiece placement system having a telescopic arm with a suction force for holding the workpiece in place during the extension of the arm.

Robots, mechanical arms, automated assembly devices, and workpiece placement systems are used in production and manufacturing processes to pick and place objects. It has become increasingly desirable to utilize automated assembly techniques to perform repetitive tasks previously done by humans. Further, robots and mechanical arms can function in a manufacturing environment which is dangerous to the welfare of a human because of the presence of welding, caustic chemicals, and unguarded machining operations.

In the past, designers of robots, mechanical arms, automated assembly devices, and workpiece placement systems have generally used a combination of mechanical fingers, grippers, pneumatic cylinders, and hydraulic cylinders to pick and place a workpiece on a product being assembled. One common limitation of many of the prior systems utilized to pick and place small objects in a manufacturing process has been that the prior devices have been overly complicated, bulky, and of limited capabilities.

One prior approach to holding a small object in place during the placement stage has been to use a magnetic head. Often, the magnetic heads have proven problematic in releasing the workpiece from the assembly arm for placement on the product being manufactured. Additionally, the use of a magnetic head inherently limits the flexibility of the apparatus because workpieces that are not magnetically attractable can not be used with the device. Therefore, in todays marketplace a system having a magnetic head minimizes the flexibility of the manufacturing operation, and potentially impacts the quality of the finished goods due to the unreliability of releasing the workpiece from the device.

Another approach to retaining a workpiece on a robotic arm, or automated assembly device has been to utilize a gravitational and/or inertial force. Inherently, a system that utilizes gravity to hold the workpiece in place on a mechanical arm limits the applicability thereof. This limitation on the movement of the mechanical arm relative to the product being assembled decreases the flexibility of the device.

The two prior approaches have limitations that reduce the flexibility of the system and reduce or eliminate the cost effectiveness of there use. The inability to consistently release a magnetically attractable workpiece at a precise location, and the limitation on the movement of a mechanical arm that holds a workpiece in place through gravity greatly decreases the economic incentive to use these devices.

Even with the variety of early designs there remains a need for a workpiece placement system with a vacuum suction force for holding the workpiece in place while it is being placed on a product being manufactured. The present invention satisfies this need in a novel and unobvious way.

SUMMARY OF THE INVENTION

To address the unmet needs of prior workpiece placement systems, the present invention contemplates a robotic system for placement of a workpiece, comprising: a vacuum source providing a vacuum pressure below ambient conditions; a mechanical housing; a movable arm mounted to the housing and movable with respect to the housing along a linear direction between a retracted position and an extended position; and a vacuum conduit along the movable arm and having at least one opening near a distal end of the movable arm, wherein the vacuum source is coupled to the vacuum conduit to suck and hold a workpiece at the opening during movement of the movable arm between the retracted and extended positions.

One object of the present invention is to provide an improved workpiece placement system.

Related objects and advantages of the present invention will be apparent from the following description.

DESCRIPTION OF THE PREFERRED EMBODIMENT

Figure 1:
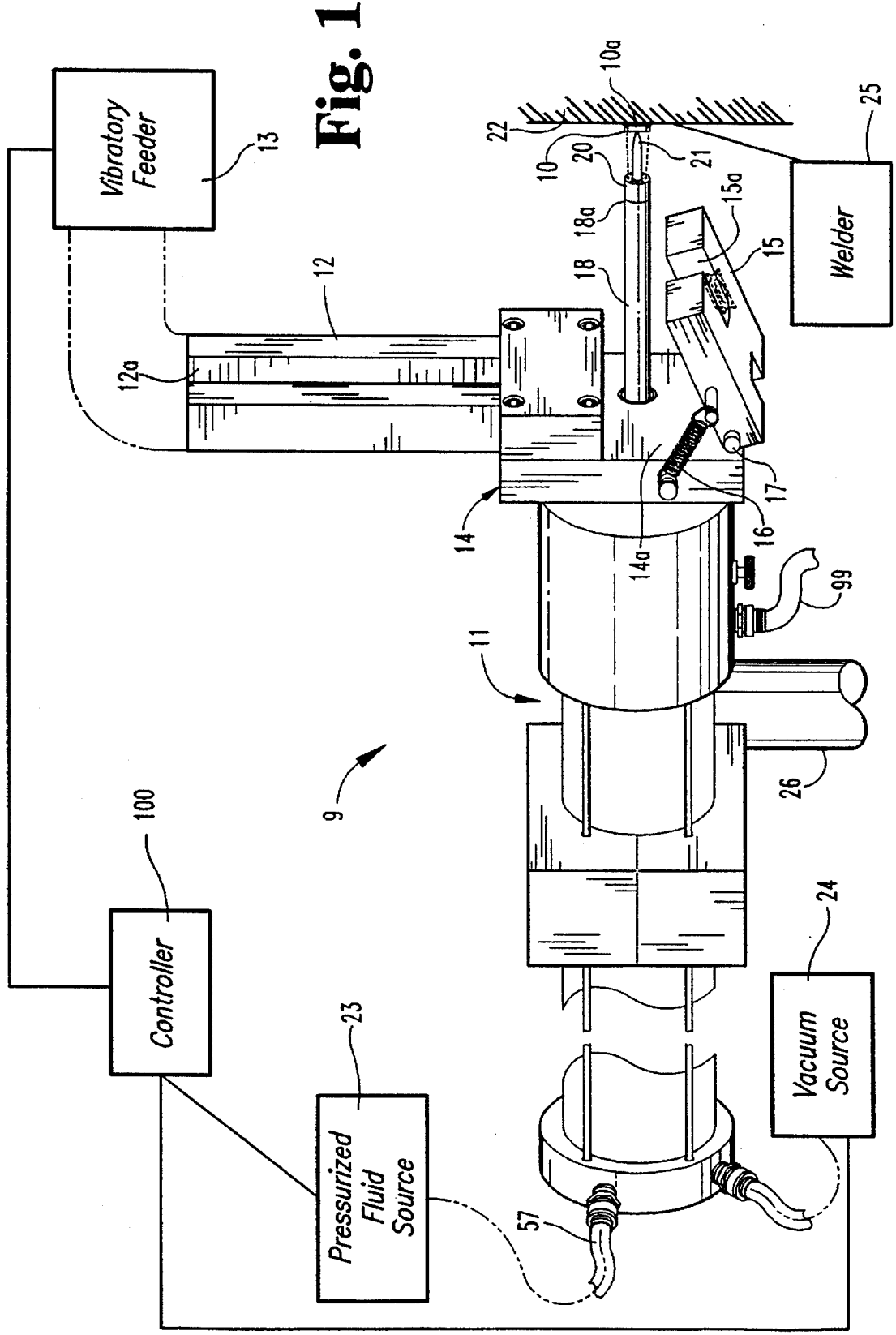
FIG. 1 is a perspective view of a workpiece placement system according to a typical embodiment of the present invention with its telescopic arm in an extended state.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and method, and such further applications of the principles of the invention as illustrated therein being contemplated as would normally occur to one skilled in the art to which the invention relates.

Referring to FIG. 1 there is illustrated a workpiece placement system 9 which is designed and manufactured in accordance with the present invention. Workpiece placement system 9 picks and places a workpiece 10 at a precise location on a product 22 that is being assembled. In the preferred embodiment the workpiece placement system 9 includes a pneumatic cylinder 11 that has a workpiece feeder 12 attached thereto. The pneumatic cylinder 11 provides the force to drive a moveable arm 18 from a retracted position to an extended position.

The workpiece feeder 12 provides a channel 12a through which the workpieces 10 are transferred from a vibratory feeder 13. The individual workpieces 10 are held in queue prior to being released to the workpiece feeder 12. A control signal from a controller 100 releases an individual workpiece 10 to the workpiece feeder 12. The workpiece feeder 12 is attached to a mounting block 14 that in turn is mounted on the pneumatic cylinder 11. The mounting block 14 is fabricated from an aluminum plate that provides structural integrity while having a minimum weight.

A workpiece delivery unit 15 is pivotally connected to the mounting block 14 by a hinge pin 17. The workpiece delivery unit 15 has a slot 15a formed therein to receive and temporarily hold the individual workpiece 10 that has been delivered through the workpiece feeder 12. A return spring 16, having a sufficient spring force to bias the workpiece delivery unit 15 against surface 14a of the mounting block 14, maintains the delivery unit 15 in a normally closed position. In FIG. 1, there is illustrated the workpiece delivery unit 15 in an open position that is caused by the extension of telescopic arm 18. Telescopic arm 18 engages the workpiece 10 and forces the delivery unit 15 into its open position, thereby releasing the workpiece 10 for placement on product 22.

Telescopic arm 18 has a distal end 18a with a workpiece holder 20 attached thereto. The workpiece holder 20 includes a tapered sphere 21 that extends distally from the telescopic arm 18 and is receivable within a central aperture 10a of workpiece 10. In the preferred embodiment the telescopic arm 18 is extendable in a linear direction from a retracted position to an extended position when a pressure differential is created within the pneumatic cylinder 11 by the delivery of a pressurized fluid from a pressurized fluid source 23. In one alternate form of the present invention the telescopic arm is extendable in non-linear path, such as a circular arc. In the preferred embodiment the pressurized fluid is air.

A vacuum source 24 suitable for producing a vacuum pressure below the atmospheric pressure within the ambient environment is in fluid communication with the pneumatic cylinder 11. A conduit extending along the pneumatic cylinder 11 (described in detail below) connects the vacuum source 24 with the workpiece holder 20 to deliver a suction force for holding the workpiece 10 adjacent the workpiece holder 20. The vacuum source 24 receives a control signal from the controller 100 which interrupts the vacuum and eliminates the suction force holding the workpiece 10 in place after the telescopic arm 18 has been fully extended. In an alternate form of the present invention a quantity of pressurized fluid is passed through the conduit to positively displace the workpiece 10 from the workpiece holder 20.

In the preferred embodiment a resistance welder 25 welds the workpiece 10 to the product 22. In alternate forms of the present invention an adhesive gun, riveting tool, and other fastening devices that are well known in the art are utilized to affix the workpiece 10 to the product 22. The workpiece placement system 9 is mounted on a moveable stand 26 that allows the system to be freely positioned relative to product 22.

Figure 2:
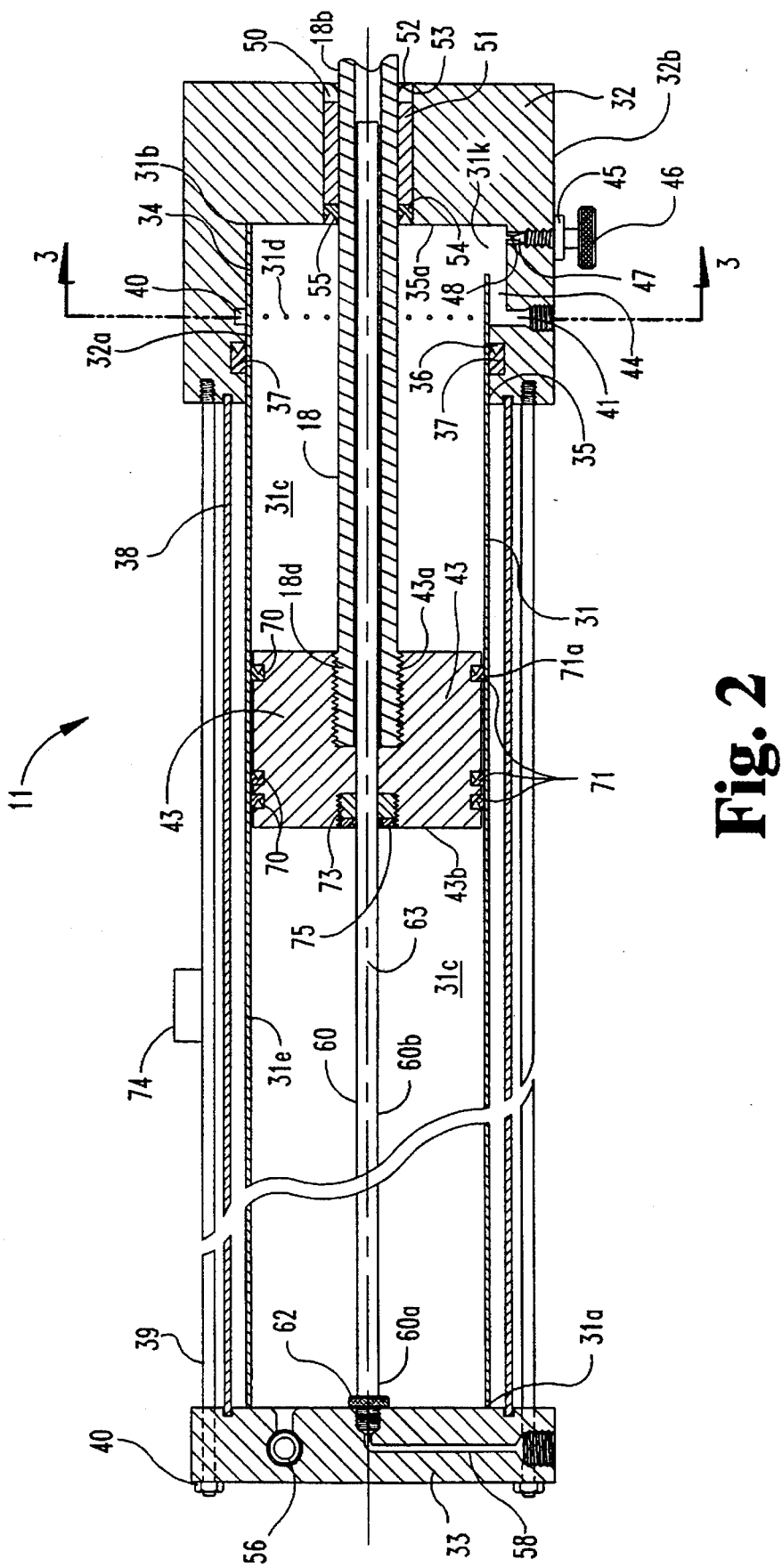
FIG. 2 is a side elevational view in full section of a pneumatic cylinder comprising a portion of the FIG. 1 workpiece placement system.
Figure 3:
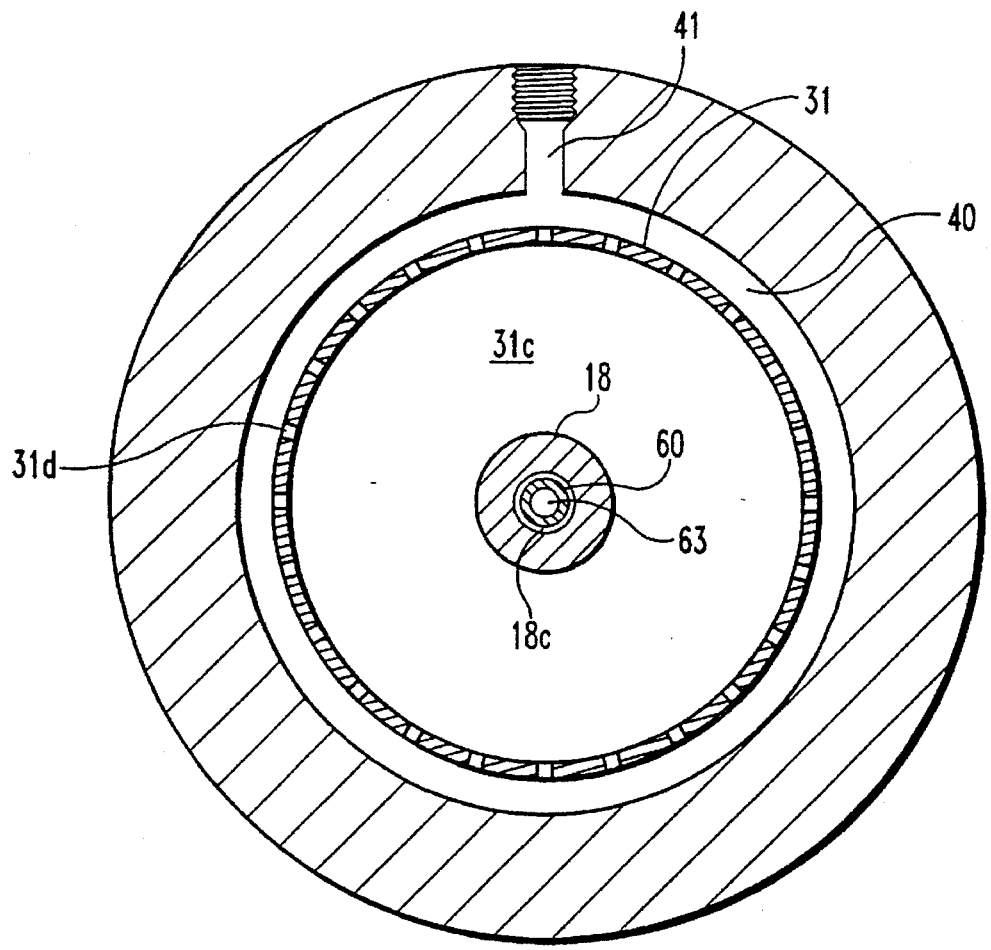
FIG. 3 is an enlarged end elevational view in full section taken along line A—A of the FIG. 2 pneumatic cylinder.

With reference to FIGS. 2 and 3, there is illustrated the pneumatic cylinder 11 having a cylindrical body 31 that is fabricated from stainless steel tubing. Stainless steel material was selected because of its superior corrosion resistance and compatibility with sliding seals. In an alternate form of the present invention cylindrical body 31 is fabricated from nickel or chromium plated tubing. The cylindrical body 31 is positioned between a head block 32 and a cap block 33. The pair of blocks 32 and 33 close off the ends 31a and 31b of the cylindrical body 31 to define an interior volume 31c. An outer cylindrical housing 38 is positioned concentrically around the inner cylindrical body 31 to protect it to from damage that could result from being struck by an object. A plurality of threaded rods 39 and nuts 40 are connected between the blocks 32 and 33 to hold the pneumatic cylinder 11 together.

The head block 32 is connected to the cylindrical body 31 adjacent the workpiece holder 20 and is machined from 6061-T6 aluminum stock. A cylindrical bore 34 is formed in the head block 32 to receive the end 31b of cylindrical body 31. Cylindrical bore 34 defines a cylindrical sidewall surface 35 and an annular endwall surface 35a. An annular ring 36 is machined into the cylindrical sidewall surface 35 to receive a seal 37 therein, which forms a fluid type joint between the cylindrical body 31 and the head block 32. In the preferred embodiment the seal 37 is manufactured from a carborilated nitrate with teflon compound. The seal 37 includes a rounded lip which insures proper sealing and a long service life. Seals of this type are generally well known in the art.

An annular exhaust ring 40 is formed in the cylindrical sidewall surface 35 to create a passageway for the transfer of fluid from the interior volume 31c of the cylindrical body 31 to an exhaust port 41. The exhaust port 41 is also connected via a flexible hose 99 to the pressurized fluid source 23. In the preferred embodiment the exhaust port 41 is defined by an aperture extending from the exhaust ring 40 to the exterior surface 32b of the head block 32. The interior volume 31c of the cylindrical body 31 is placed in fluid communication with exhaust ring 40 through a series of apertures 31d formed in a spaced apart relationship around the entire 360° circumference of the cylindrical body 31. The apertures 31d normally function as bleed holes for transferring fluid into and out of the internal volume 31c of cylindrical body 31, thereby enabling the pneumatic cylinder 11 to operate. However, instead of a pneumatic cylinder alternate forms of the present invention contemplate the use of hydraulic cylinders, servo motors, worm gears, rack gears and other to produce this movement of arm 18.

A passageway 44 is machined in the cylindrical sidewall surface 35 of the head block 32 for connecting the interior volume 31c of the cylindrical body 31 with a needle valve 45. A corresponding opening 31k is formed in the cylindrical body 31 to connect the interior volume 31c with the passageway 44. The needle valve 45 controls the flow of fluid out of the internal volume 31c of the cylindrical body 31 after the piston 43 passes the series of apertures 31d. Needle valves are generally well known in the art for adjusting the fluid flow from a chamber. The rotation of handle 46 of needle valve 45 positions the valve stem 47 relative to the valve seat 48 to either increase or decrease the volumetric flow rate of fluid exiting the needle valve 45. In the preferred embodiment the adjustment of needle valve 45 is utilized to control the deceleration of the piston 43 between the plurality of apertures 31d and the head block 32 to provide a cushioned stop. The exhaust port 41 still receives fluid from passageway 44 after the apertures 31d have been sealed shut by the piston 43.

A cylindrical aperture 50 is formed through head block 32 for receiving a bushing 51 to guide and support the telescopic arm 18. In the preferred embodiment the bushing 51 is a sintered bronze bushing that is generally well known in the art. Inherent to a manufacturing environment in which welding and machining are performed is a likelihood that workpiece placement system 9 will be subjected to a hostile environment. A hostile environment includes the presence of air borne contaminants that can damage and interfere with the moving parts. To minimize or eliminate the detrimental effects of contaminants being imparted onto the workpiece placement system 9 a dust seal 52 has been positioned within head block 32 adjacent the telescopic arm 18. The dust seal 52 includes a wiper blade 53 that is in circumferential contact with an outer surface 18b of the telescopic arm 18 to wipe the surface free of contaminants.

The cylindrical body 31 includes a seal 54 to prevent the leakage of fluid from the internal volume 31c through the aperture 50 formed in head block 32. In the preferred embodiment the seal 54, formed from a carborilated nitrate with Teflon compound, is disposed in circumferential contact with the telescopic arm 18. More specifically a rounded lip 55 formed on seal 54 is disposed in circumferential contact with the outer cylindrical surface 18b of the telescopic arm 18. This rounded lip 55 of seal 54 insures proper sealing and a long service life in a environment in which additional lubrication is not generally utilized.

The cap block 33 closes the other end 31a of the cylindrical body 31 and has inlets formed therein for the connection to pressurized fluid source 23 and vacuum source 24. In the preferred embodiment the pressurized fluid inlet 56 allows the connection of a flexible hose 57 or steel tubing to deliver the pressurized fluid necessary to operate the pneumatic cylinder 11. Further, when the telescopic arm 18 is retracted from its extended position the pressure inlet 56 serves as an vent to exhaust fluid from the cylindrical body 31. The cap block 33 is machined from 6061-T6 aluminum stock that has been anodized for corrosion resistance. A conduit 58 is formed in the cap block 33 to connect the vacuum source 24 to the piston rod 60.

The piston rod 60 is fixedly mounted within the internal volume 31c of the cylindrical body 31 such that it passes longitudinally through the cylindrical body 31 and is supported by the cap block 32 and the head block 33. The piston rod 60 is fabricated from high strength steel stock that has been ground, polished and hard chrome plated on its exterior surface 60b to provide superior wear resistance. The piston rod 60 is positioned substantially parallel with the cylindrical body 31. A compression fitting 62, that is generally well known in the art, attaches the first end 60a of the piston rod 60 to the cap block 33, and provides a fluid tight seal between the piston rod 60 and the conduit 58. The piston rod 60 extends longitudinally from compression fitting 62 and is received within an aperture 18c that is formed axially through the center of telescopic arm 18.

Piston rod 60 is supported at its second end 60b by bushing 51 that is disposed within head block 32. By having fixed support at both ends of piston rod 60 the deflection of piston rod 60 in a loaded condition is minimized. A cylindrical aperture 63 extends longitudinally through the entire length of piston rod 60. This aperture 63 provides a fluid communication conduit through which vacuum source 24 can deliver a below atmospheric pressure to workpiece holder 20. Further, the aperture 63 in an alternate form of the present invention is utilized to deliver a charge of pressurized fluid to the workpiece holder 20 for displacing the workpiece 10 from sphere 21.

Working piston 43 which has three annular grooves 70 formed thereround for receiving each a seal 71 therein, is located within the internal volume 31c of cylindrical body 31, and has telescopic arm 18 fixedly affixed thereto. Piston 43 is slideably mounted on the stationary piston rod 60. The seals 71 are formed from a carborilated nitrate with teflon compound to provide superior sealing in an environment where no additional lubrication is added. The rounded lip 71a insures proper sealing at all pressures while preventing rolling of the seal. The three seals 71 provide a fluid tight seal between the piston 43 and the internal cylindrical wall surface 31c of the cylindrical body 10.

The telescopic arm 18 is fabricated from stainless steel and has an externally threaded end 18d which is received within an internally threaded bore 43a formed in the solid aluminum piston 43. The solid aluminum piston is designed and constructed to be strong and light weight. An externally threaded steel bushing 73 having a bore therethrough is disposed on the cap end 43b of piston 43. The steel bushing 73 can be interfaced with a limit switch 74 to control the longitudinal travel of the piston 43 within the cylindrical body 31. Limit switch 74 is moveably placed on the exterior of pneumatic cylinder 11. Located adjacent the bushing 73 is a seal 75 which circumferentially engages the outer surface 60b of piston rod 60. In the preferred embodiment the seal 75 is formed from a carborilated nitrate with Teflon compound and includes a rounded lip design that insures proper sealing and long serve life in an environment with no added lubrication. The seal 75 prevents the seepage of pressurized fluid into the piston rod aperture 63.

Figure 4:
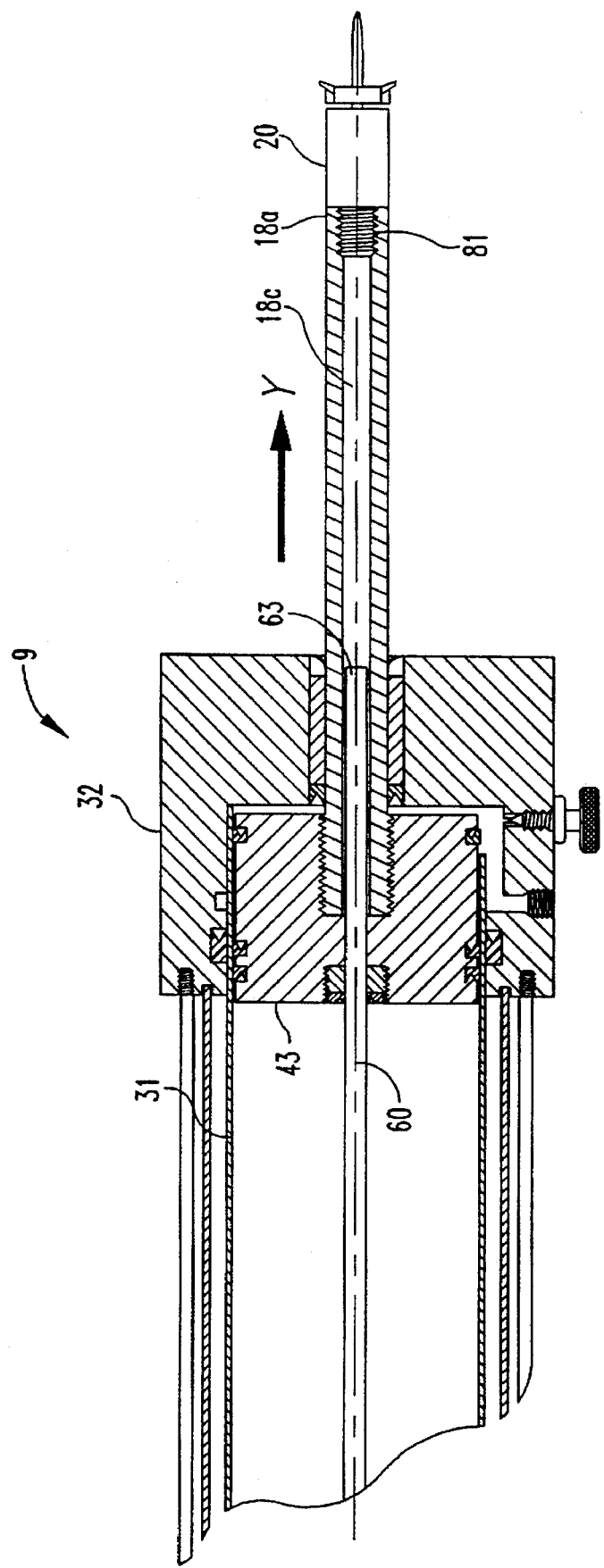
FIG. 4 is a partial side elevational view in full section of the pneumatic cylinder comprising a portion of the FIG. 1 workpiece placement system in an extended state.
Figure 6:
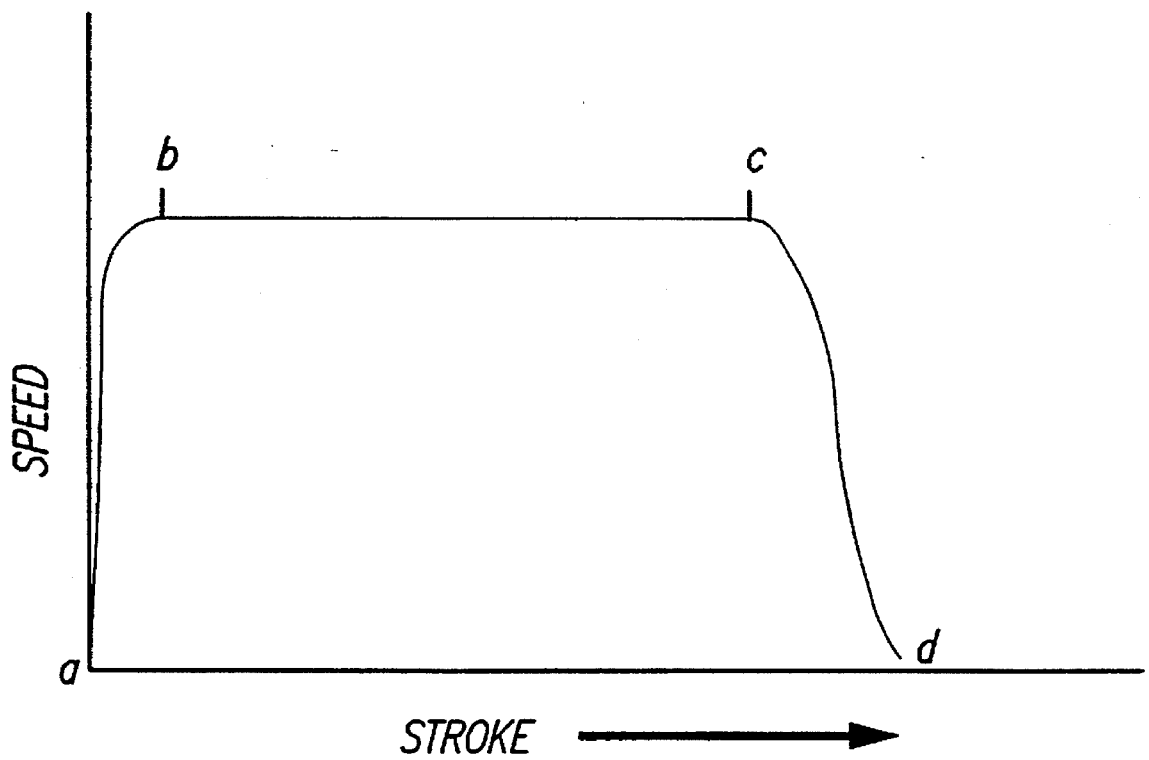
FIG. 6 is a graphical view of the relationship between the velocity of a piston comprising a portion of the FIG. 1 workpiece placement system and its position within the pneumatic cylinder.

With reference to FIG. 4, there is illustrated the workpiece placement system 9 in a fully extended state. The influx of pressurized fluid into the cylindrical body 31 creates a pressure differential which drives the piston 43 proximate the head block 32. The axial movement of the piston 43 in the direction of arrow Y moves the telescopic arm 18 from its retracted position to its extended position. In its extended position the telescopic arm 18 delivers the workpiece 10 to the product 22. The telescopic arm 18 has attached at its distal end 18a a workpiece holder 20 which is in fluid communication with the aperture 63 formed through the piston rod 60.

Figure 5:
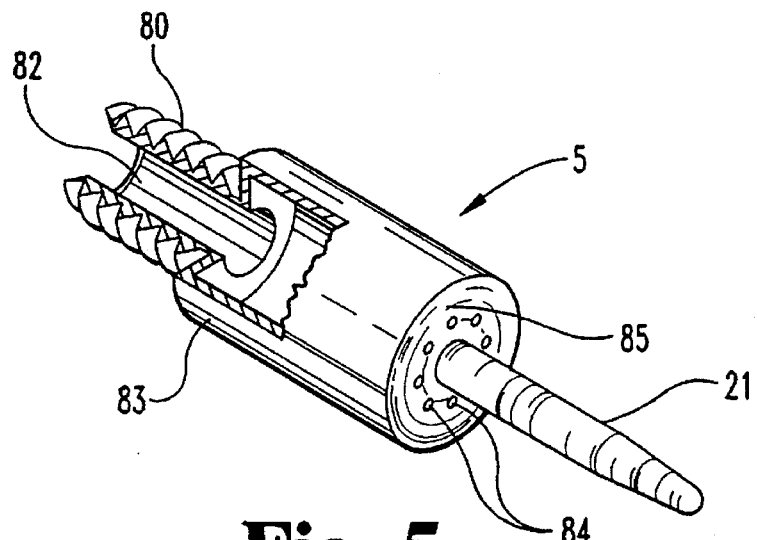
FIG. 5 is a perspective view in partial section of a workpiece holding unit comprising a portion of the FIG. 1 workpiece placement system.

In FIG. 5, there is illustrated the workpiece holder 20 that includes an externally threaded end 80 which corresponds to the internally threaded surface 81 formed on the distal end 18a of the telescopic arm 18. The ratio of length of the telescopic arm to the diameter of the distal end of the arm is at lease 10:1, which facilitates the ability of the arm to be used in a confined space. The workpiece holder 20 has an aperture 82 formed longitudinally through its main body portion 83 which is in fluid communication with the vacuum source 24. The main body portion 83 has a plurality of relief bores 84 formed therein which allows the vacuum source 24 to exert a suction force on workpiece 10 to hold the workpiece adjacent the workpiece holder surface 85. The location of the relief bores 84 on the workpiece holder surface 85 correspond to the distribution of mass of the workpiece 10. Sphere 21 extends distally from the main body portion 83 and is sized appropriately to be received within the aperture 10a of the workpiece 10. The geometric proportions of the workpiece holder 20 are selected based upon the configuration of the workpiece being handled. A variety of workpiece holders 20 are contemplated which would be freely interchangeable, thereby allowing additional flexibility for this device. One alternative form of the present invention uses a suction cup with relief bores formed therein. This alternate form of the present invention is designed to place studs in a manufacturing process.

With reference to FIGS. 1–6, the movement of the piston 43 within the pneumatic cylinder 11 will be described. In response to a signal from controller 100 the pressurized fluid source 23 delivers a steady flow of pressurized fluid to the internal volume 31c of the cylindrical body 31. The delivery of the pressurized fluid causes a pressure differential between the head block 32 and the cap block 33 causing piston 43 to travel within the cylindrical body 31. Prior to the influx of pressurized fluid the piston 43 is stationary, and thereafter accelerates almost instantaneously to a maximum velocity. The acceleration of the piston 43 is illustrated on FIG. 6 between points a and b. This rapid acceleration of piston 43 is due to its light weight and the minimum amount of friction between the piston 43, the piston rod 60, and the cylindrical wall surface 31c. After accelerating to a maximum velocity, the piston 43 travels at a substantially constant velocity until engaging the apertures 31d. The constant velocity of the piston 43 is illustrated on FIG. 6 between points c and d.

Prior to piston 43 blocking the apertures 31d in the cylindrical body 31 the fluid disposed between the piston 43 and the head block 32 is exhausted through the exhaust port 41. However, once the piston 43 blocks the apertures 31d (illustrated as point c on FIG. 6) the remaining fluid is exhausted through passageway 44. This restriction in outflow of the fluid causes the piston 43 to be decelerated to a resting position adjacent head block 32. The deceleration of the piston 43 is illustrated on FIG. 6, between points c and d. To return the piston to the beginning of its stroke a steady flow of pressurized fluid is delivered to the cylindrical body 31 to drive the piston in the opposite direction through the cylinder.

An example of placing a workpiece 10 against a product 22 will now be described. The vibratory feeder 13 provides a steady flow of the individual workpiece 10 for release to the workpiece feeder 12. The workpieces 10 are individually released to workpiece delivery unit 15. The individual workpiece 10 is positioned within the workpiece delivery unit 15 proximate the workpiece holder 20 such that sphere 21 is aligned with the aperture 10a of workpiece 10. An influx pressurized fluid drives the piston 43 axially within the cylindrical 31 causing the corresponding extension of the telescopic arm 18. The extension of the telescopic arm 18 forces the workpiece delivery unit 15 to pivotally open, thereby allowing the individual workpiece 10 to be captured and transported via sphere 21 of the workpiece holder 20. A signal from the controller 100 causes the vacuum source 24 to draw a vacuum force that sucks the workpiece 10 securely against the workpiece holder surface 85. When the piston 43 has finished its stroke and is disposed adjacent the head block 32 the telescopic arm 18 is fully extended. The workpiece 10 is now disposed adjacent the product 22 and the vacuum source 24 is interrupted, thereby eliminating the suction force which holds the workpiece 10 onto the workpiece holder 20. An alternate form of the present invention delivers a blast of pressurized fluid through apertures 84 to positively displace the workpiece 10 from the workpiece holder 20.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A robotic system for placement of a workpiece having an opening therein, comprising:
   a vacuum source providing a vacuum pressure below ambient conditions;
   a mechanical housing;
   a movable arm mounted to said housing and movable with respect to said housing between a first position and a second position;
   a spear member mounted near a distal end of said movable arm and insertable through the opening in the workpiece;
   a vacuum conduit along said movable arm and having at least one opening near a distal end of said movable arm, wherein said vacuum source is coupled to said vacuum conduit to suck and hold a workpiece on said spear member during movement of said movable arm between said first and second positions; and
   a workpiece holder for holding the workpieces adjacent said first position, said holder for presenting the workpieces to said spear member and being pivotally mounted to allow said workpieces to be captured on said spear as said moveable arm extends between said first and second positions.

2. The robotic system of claim 1 wherein said moveable arm is located coaxially within said mechanical housing for telescopic movement between said first position and said second position, and wherein said vacuum conduit being coaxial with said moveable arm.

3. The robotic system of claim 2 wherein said vacuum source being interruptible to release said workpiece at said second position.

4. The robotic system of claim 2 which further comprises:
   a piston slideably mounted within said mechanical housing;
   a pressure source providing a pressurized gas above ambient conditions, said pressure source being connected to said mechanical housing for providing a pressure differential across said piston;
   said pressurized fluid contacting said piston to move said piston within said housing relative to said pressure differential.

5. The robotic system of claim 4 wherein:
   said moveable arm has a distal end adjacent said workpiece; and
   said movable arm has a linear distance between said first position and said second position at least ten times greater than the diameter of said distal end of said moveable arm.

6. The robotic system of claim 5, which further includes a vibratory feeder for transporting workpieces to said workpiece holder.

7. The robotic system of claim 6, wherein said workpiece holder being normally spring biased closed and the force associated with moving said moveable arm overcomes the spring force holding the workpiece holder in a closed position.

8. The robotic system of claim 1, wherein said moveable arm being located coaxially within said mechanical housing for telescopic movement between said first position and said second position.

9. The robotic system of claim 1 wherein said mechanical housing being at least at ambient pressure.

* * * * *